United States Patent [19]
Geesen et al.

[11] 3,721,906
[45] March 20, 1973

[54] CODED PULSE PAIR DETECTOR WITH IMPROVED DETECTION PROBABILITY

[75] Inventors: Michel Pierre Georges Geesen; Andre Pierre Laganier, both of Boulogne, France

[73] Assignee: International Standard Electric Corporation, New York, N.Y.

[22] Filed: June 15, 1970

[21] Appl. No.: 46,053

[30] Foreign Application Priority Data

June 13, 1969 France..................................6919637

[52] U.S. Cl. ..................328/109, 307/232, 307/234, 307/267, 328/119, 343/6.5 LC, 343/6.8 LC
[51] Int. Cl. ............................................H03k 5/20
[58] Field of Search ......307/232, 234, 267; 328/109, 328/110, 119; 343/6.5 LC, 6.8 LC

[56] References Cited

UNITED STATES PATENTS

| | | | |
|---|---|---|---|
| 3,051,928 | 8/1962 | Sullivan | 328/119 X |
| 3,412,381 | 11/1968 | Hirsch et al. | 328/119 X |
| 3,551,823 | 12/1970 | Stevens | 328/119 |

FOREIGN PATENTS OR APPLICATIONS

| | | | |
|---|---|---|---|
| 1,482,954 | 4/1967 | France | 328/119 |

Primary Examiner—Stanley D. Miller, Jr.
Attorney—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

An improved decoder for IFF interrogations is provided to increase the average probability of detection. The first pulse of the pulse pair interrogation is stretched via logic circuitry to increase the probability of coincidence with the second pulse of the interrogation. This allows for a certain amount of variation or jitter in the timing of the incoming pulse pair.

2 Claims, 8 Drawing Figures

CODED PULSE PAIR DETECTOR WITH IMPROVED DETECTION PROBABILITY

BACKGROUND OF THE INVENTION

The present invention relates to methods and means whereby the conditions that prevail in the recognition of coded interrogations which are received as pairs of pulses in various systems of radar-responder decoders can be improved, namely by increasing the rate of responses to interrogations.

In systems that are provided with a responder, either located at a ground station, as in the instance of the TACAN system, or on an aircraft, as in the well known instance of secondary-radar and IFF systems, the method used for returning the signals comprises receiving, detecting and recognizing an interrogation signal in form of a pair of pulses spaced according to a conventional mode, and sending back a response signal having a conventional form.

It is known to use a delay line for detecting and recognizing pairs of interrogation pulses, said line having a plurality of output taps with means adapted to identify a coincidence between the first pulse of a pair, as it comes out of one of such delay line taps, and the second received pulse of the pair, which occurs at the input inlet of the delay line at the same time as the delayed first pulse.

It is known that shift registers having a plurality of outputs are more and more used in responders instead of the afore-mentioned delay line. Such a register is adapted to forward a pulse applied to its input at the rate of pulses from a clock that is connected to it.

Owing to this, there occurs a quantized process with a quantum of time equal to the period of the timing clock, also called a "step" and designed $\theta$ in the following description. Known interrogation-decoding means are devised on the assumption that the step is an integral submultiple of a standard interval of time, $T_o$, comprised between the leading edges of the two pulses that form an interrogation pair, and that the clock being synchronized by the first interrogation pulse. In fact, even assuming that such a synchronism can be attained, there is indeed some shift $\Delta T$ between the nominal value $T_o$ and an actual interval of time $T$ between the two pulses. The first pulse is so delayed in the register that it appears at the output from the $n$-th section of the register after a time $T_o = n\theta$, and last for a time $\theta$. The second pulse occurs at this instant at the register inlet. When $\Delta T$ is negative, coincidence can take place only due to the width of this second pulse. When $\Delta T$ is positive, coincidence can take place so long as $\Delta T$ is smaller than $\theta$.

It will thus be seen that all interrogation pairs will be recognized provided the maximum value $\Delta T_o$ of shift $\Delta T$ is smaller than $\theta$ and the width of the second pulse is at least as large as $\Delta T$. In other words, the rate of response $\rho$, which measures the ratio of the recognized interrogations (those that have caused a response transmission) to the overall number of interrogations received (and which are not always recognized) is equal to 1 in accordance with that assumption.

However, in most applications, is is required that the precise instant when the leading edge of the second pulse comes in, be recognized therefore, all of the original width of the interrogation pulses cannot be used, but only a very short derived pulse, the width of which is substantially limited to the rise period of the leading edge is of use. Under such conditions, and still assuming that the timing clock is synchronized with the leading edge of the first interrogation pulse, known devices do not allow the interrogations to be recognized when the actual spacing of the two pulses is smaller than the nominal interval $T_o$. All other interrogations can be recognized by such devices, i.e., with a rate of response $\rho = 1$ when the maximum shift $\Delta T_o$ is smaller than $\theta$. On the whole, when shifts of both signs are considered, and when all values of T within the limits $T_o = \Delta T$ and $T_o + \Delta T$ occur with equal probability, the rate of response is 0.5 when $\Delta T$ is smaller than $\theta$. It will be noted that the curve showing the rate of response $\rho$ as a function of shift $\Delta T$ (algebraically valued) has an unsymmetrical shape.

There have been proposed, various techniques for managing the known devices, which, by way of principle, attempt to make this curve of response rate symmetrical, and obtain values of $\rho$ close to 1 within wide limits of $\Delta T$, by taking the delayed first pulse not only from a register or delay line section of rank $n$ but also from some adjacent sections. In practice, however, all such solutions are relatively inefficient, because under ordinary conditions of use, it is almost impossible to secure, by known methods, adequate synchronization of the pulses from the timing clock with the first interrogation pulse. This is true because synchronization does not always occur at the first pulse of an interrogation pair to be detected and recognized, but often in response to a spurious pulse, when operating in a disturbed area, or sometimes at the first pulse of a pair that will not be recognized. Accordingly, the response ratio will no longer be equal to 1.

It is possible to determine analytically what will occur when synchronization is effected as defined above, and when the best use of shift register abilities is attempted in attempting to maximize the response ratio at a value close to 1, allowing for symmetrical curves of $\rho$ as a function of shift $\Delta T$. As in the preceding, it will be assumed that coincidence will be recognized between the first pulse of an interrogation (as it comes out of an output of a register section of rank $n$), and the second pulse, the leading edge of which occurs at the same instant at the register input. Since there is no synchronization, the time lag of a pulse with respect to the timing clock after the leading edge of the first interrogation pulse as this pulse enters the register can take any value with equal probability. Therefore, the outlet from a section of rank n will provide the said leading edge after a time $T = (n - 1)\theta + r\theta$, where $r$ is a random parameter between 0 and 1, and this pulse presence will last a time $\theta$.

The leading edge of the second pulse will reach the coincidence device after a time $T = T_o + \Delta T$, where $T_o$ is equal to $n\theta$ and is the nominal time interval between the two pulses of a pair, and $\Delta T$ is an algebraic measure of the shift from said nominal interval. There will be coincidence, and thus recognition of interrogation, each time $\Delta T$ is comprised between the limits $(r - 1)\theta$ and $r\theta$.

The curve in FIG. 1 shows the variations of said limits as a function of $r$. It will be stated that coincidence will always occur when $\Delta T = 0$, which means that the rate of response $\rho$ is always 1 when $\Delta T = 0$. If $|\Delta T| >> \theta$, coincidence is no longer possible. Then for intermediate values of $|\Delta T|$, the rate of response is proportional to $r$. Now, as $r$ is a random variable, ordinate $r$ also shows the probability of a response rate $\rho$. It will be seen that an interrogation pair will be recognized in 50 percent of the instances when $|\Delta T| = \theta/2$. Therefore, it may be said that, in statistical terms, the average response rate will reach a maximum value of 0.5 with such a device. The curve of FIG. 1, which is symmetrical, may be designed as a curve of response rate $\rho$, as a function of shift $\Delta T$ (say $\rho = f(\Delta T)$) for the one output from the register section of rank $n$. The shifts are centered about $T_o$.

In the known art, it was attempted to widen this curve in a way so as to increase the range of shifts with which the rate of response would be equal to 1. To this end, one or more outputs from sections of ranks $n + 1$, $n - 1$, $n + 2$, $n$ 2, etc. were combined with the output from section of rank $n$.

A curve $\rho = f(\Delta T)$ related to each output will be obtained from the curve in FIG. 1 by a translation to the right or to the left, by a multiple of $\theta$. When curves $\rho = f(\Delta T)$ for outputs from sections of rank $n$ (FIG. 1) and $n - 1$ (FIG. 2) are combined, the overall curve of FIG. 3 results, which shows that a rate of response equal to 1 will be obtained with shifts between $-\theta$ and 0. This curve is no longer symmetrical, and it could become symmetrical only if a method were devised, which would allow it to be shifted to the right by $\theta/2$, which corresponds to half a step of the register.

If the output from a register section of rank $n + 1$, shown in FIG. 4, were added to the combination of outputs from sections of ranks $n$ and $n - 1$, a symmetrical curve $\rho = f(\Delta T)$ (FIG. 5) would be obtained, which shows that the combination in question would yield a rate of response equal to 1 with shifts $\Delta T$ comprised between $-\theta$ and $\theta$, this rate dropping to zero with shifts larger than $2\theta$ in absolute value.

The outputs of a larger number of adjacent sections can also be combined. As a general rule, when an odd number $2p + 1$ of successive register sections are combined, curves $\rho = f(\Delta T)$ are symmetrical, the shift $\Delta T$ from $T_o$ that corresponds to a rate of response 1 can reach $(p - \frac{1}{2})\theta$, and rate of response becomes nil with shifts $\Delta T$ over $(p + \frac{1}{2})\theta$.

Devices that allow the above-mentioned combinations to be carried out are critical in operation because the use of parts such as an INCLUSIVE-OR gate having as many inputs as there are associated register sections is implied. Each such output must be connected to a coincidence detector, and the arrangement is duplicated for each interrogation mode which can be recognized by the decoder. Moreover, these devices, which allow the curves $\rho = f(\Delta T)$ to be extended, require more sections as the desired extension is widened. Finally, there is no known method which would be simple and provide symmetrical curves $\rho = f(\Delta T)$ with an even number of sections having their outputs combined.

SUMMARY OF THE INVENTION

It is a general object of the present invention to provide improved and simplified devices which, when associated with the commonly used shift register, allow the same results to be attained, as regards the improvement of the response rate, as achieved by combining outputs from several successive sections according to the hereinbefore described known methods. Devices according to the invention provide many advantages over the prior art for a given curve of response rate as a function of shift $\rho = f(\Delta T)$. Some of these advantages are the number of sections required is smaller, even when the response-rate curves are widely extended. 2. The recognition of an interrogation is carried out on the output from a single register stage, which avoids the intrication of circuits needed to join several outputs together according to the prior known methods. 3. The response-rate curves can be easily adjusted to a symmetrical shape.

That portion of the equipment of the combination used for detecting and recognizing pairs of interrogation pulses, which is known per se, and to which devices according to the invention are added, comprises a multiple-output shift register adapted to advance by even steps, a pulse applied to its input; a set of coincidence detectors, each connected to said input and to one register output, and adapted to detect a pair of pulses that are spaced by an interval corresponding to a conventional interrogation mode; and a logical device which prevents any further pulse from entering the register input as soon as an interrogation has been detected and for the whole time during which the circuits for composing and transmitting the response message operate. Further, according to the known apparatus there is a logical device which opens a gate at the input of the shift register at the end of the composition of said response message, so that the register becomes again available for pulse decoding.

According to a broad aspect of the invention, it is provided that any incoming pulse is entered $q$ successive times into the register input, and that the recognition of a possible interrogation is carried out at a single register section of a suitable rank $s$, where $s = n - (q/2)$ when $q$ is even, and $s = n - (q - 1)/2$ when $q$ is odd, ($n$ is the number by which a shift step must be multiplied to give the interval of time between the two pulses of a pair). The curves of the response rate as a function of a pulse shift, $\rho = f(\Delta T)$, are then the same as were obtained if the incoming pulse would be entered once into the register input and the outputs from $q - 1$ the sections next to section of rank $n$ were combined with the output from this section.

According to another feature of the invention, the incoming pulse first swings a flip-flop into a condition "1" instead of directly entering the register; the signal from said condition "1" at the register input progresses through the register at the rate of the timing clock, and when the section of rank $q$ is reached, the output from that section, together with those of the preceding sections, which are connected to the said flip-flop through an AND gate, operate to reset said flip-flop. Condition "1" recorded in the $q$ sections progresses as a whole, so that when it reaches the $n$-th section, it marks the outlet of the latter during a period of $q + 1$ steps of the timing clock.

According to a further feature of the invention, which is applicable when the number $q$ of the sections into which the incoming pulses are entered is an even number, in such way that, the curves of response-rate as a function of shift $\rho = f(\Delta T)$ are unsymmetrical, the symmetry of said curves can be restored by retarding the arrival of the signal before a section of rank n by half a step.

According to the invention, the half-step lag is obtained by applying the pulses of the timing clock in a first phase to a number of the head register sections and in the opposite phase to the following sections. The recognition of the interrogations is then carried out on the section of a rank $n = q/2$.

According to a modification of that further feature of the invention, a half-step lag to the timing clock signal is obtained by using steps having a value slightly above $T_0/n$. This increase must be such that when multiplied $n$ times, it causes an increase equal to $T_0/2n$ at the level of the section where a recognition of the interrogations is carried out. Other features and advantages of the invention will appear from the description which will follow with reference to the appended drawings, in which:

DESCRIPTION OF THE PREFERRED EMBODIMENT

Figure 1:
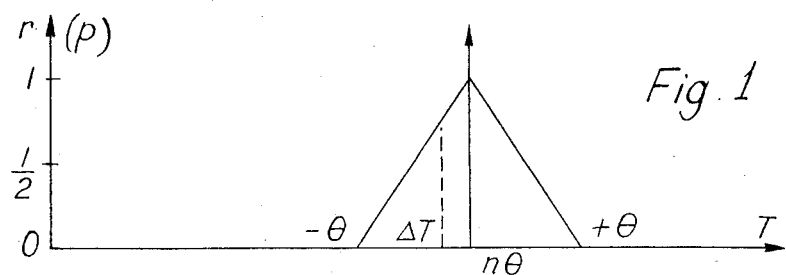
FIGS. 1 to 5 show the explanatory curves and diagrams to which reference was made hereinabove.
Figure 2:
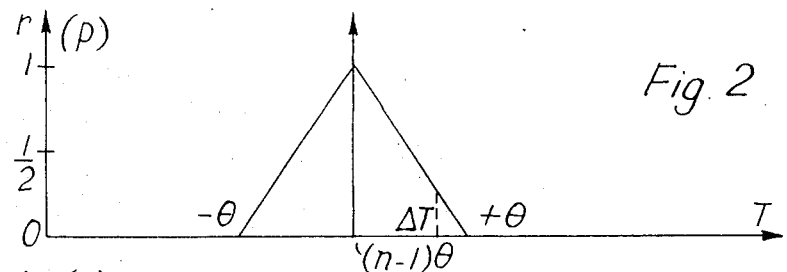
Figure 3:
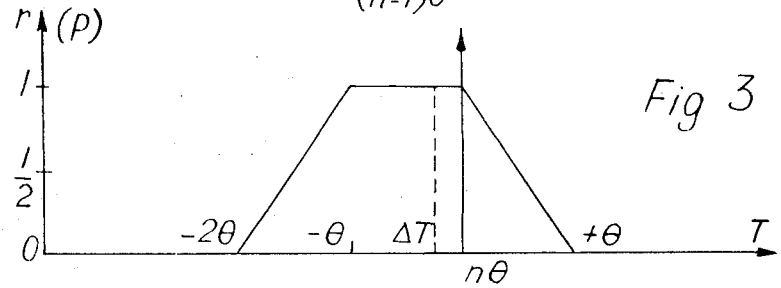
Figure 4:
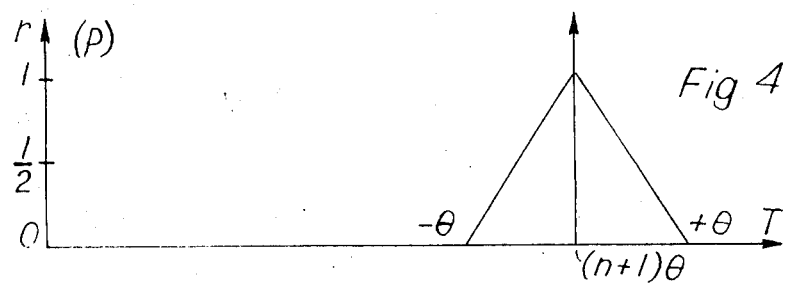
Figure 5:
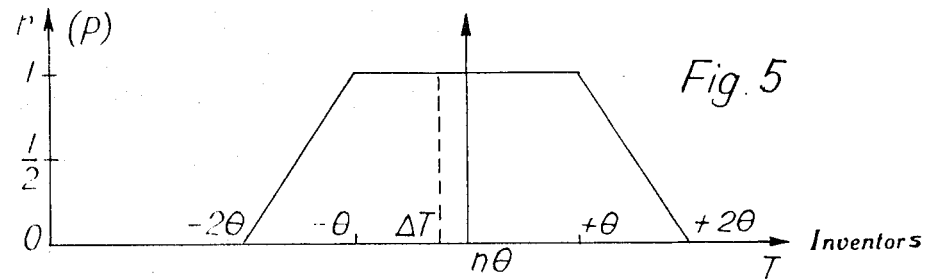
Figure 6:
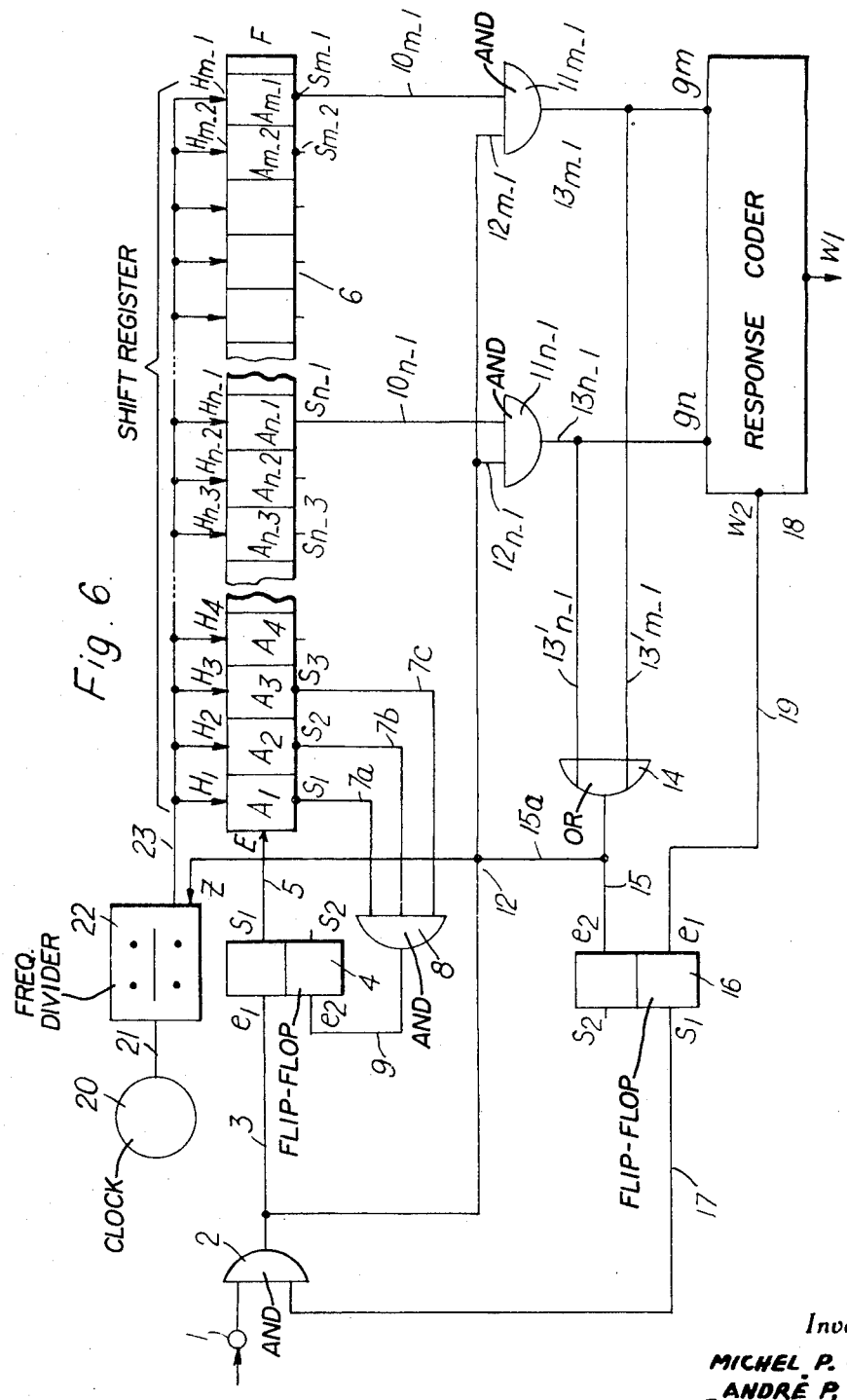
FIG. 6 gives the circuit diagram of a decoder of interrogation pairs, including the devices according to the invention.

The equipment shown in FIG. 6 comprises an input 1 to which the detected pulses are applied, these pulses having been detected in a receiver, which is not shown, and so shaped that their widths are just equal to the rise time of the leading edge.

The serviceable signal applicable at 1 will have the form of a pair of code pulses spaced out by the time interval (or intervals) that characterize the mode (or modes) used in the particular application considered. To establish concepts and values, these intervals are of the order of a few microseconds. While this signal is awaited, or between the two pulses of a pair, spurious pulses can also be received. Input 1 is connected to one of the two inputs of an AND-type gate 2. In the condition of detection of the incoming pulses, the second input of gate 2 is marked (has signal present), so that the pulses received at input 1 come out on an output wire 3, which is connected to a write-in input $e_1$ of a flip-flop 4. Outlet $s_1$ of flip-flop 4 is connected by wire 5 to the pulse input E of a shift register 6 comprising $m -$ 1 sections $A_1, A_2, A_3 \ldots A_{n-1}, \ldots A_{m-1}$, each having an output $S_1, S_2, S_3, \ldots S_{n-1}$).

Each of outputs $S_1, S_2, S_3$ of register 6 is connected by a wire 7a, 7b, 7c respectively, to one input of an AND gate 8 the output of which is connected by a wire 9 to a reset input $e_2$ of flip-flop 4.

Except for outputs $S_1, S_2, S_3$, only outputs $S_{n-1}$ and $S_{m-1}$ of register 6 are used. These outputs correspond to the modes of the interrogation pairs, which are assumed, by way of example, to be two. These two modes will be designed hereunder as mode $n$ and mode $m$.

Outputs $S_{n-1}$ and $S_{m-1}$ of register 6 are connected each through a wire, $10_{n-1}$ or $10_{m-1}$, to one of the inputs of an AND gate, respectively $11_{n-1}$ and $11_{m-1}$, for interrogation detection. The second input of each of gates $11_{n-1}$ and $11_{m-1}$ is connected through branches $12_{n-1}$ and $12_{m-1}$ of a wire 12 to the output of gate 2.

The outputs from gates $11_{n-1}$ and $11_{m-1}$ are connected through wires $13_{n-1}$ and $13_{m-1}$ to an OR gate 14 the output of which is connected through a wire 15 to a reset input $e_2$ of a flip-flop 16 the output $s_1$ of which (through a wire 17) is connected to the second input of gate 2.

The outputs from gates $11_{n-1}$ and $11_{m-1}$ are also connected through branches of wires $13_{n-1}$ and $13_{m-1}$ to the respective inputs $g_n$ and $g_m$ of a block 18 which constitutes a conventional device of a type known per se and not a part per se, of the combination of the invention. This device 18 comprises a generator of predetermined trains of pulses and a set of modulators which successively modulate said pulses according to a conventional coded response. This coded response will come out through an outlet $W_1$ of said block 18.

The operation of the parts in block 18 is started by pulses entering through inputs $g_n$ or $g_m$. Likewise, an end-of-encoding pulse is provided at output $W_2$ from block 18 as soon as the setting up of the coded response is ended. Output $W_2$ is connected through a wire 19 to the write-in input $e_1$ of flip-flop 16.

A clock 20 is connected through a wire 21 to the input of a frequency divider 22. At the output from divider 22 pulses are provided the spacing of which, designed by $\theta$, defines the timing rate, (1 microsecond), and which are applied, through a wire 23, to the timing inputs $H_1, H_2, H_3, H_4 \ldots H_{n-1} \ldots H_{m-1}$ of sections $A_1, A_2, A_3, A_4, \ldots A_{n-1}, \ldots A_{m-1}$ of register 6. A branch 15a of wire 15 is connected to a reset input Z of frequency divider 22.

The operation of the interrogation decoder shown in FIG. 6 will now be described.

It will be assumed that at a given instant, outputs $s_1$ of flip-flops 4 and 16 are (marked) respectively in "0" and "1" conditions. Gate 2 is thus enabled, and any pulse of a sufficient amplitude that occurs at 1 passes through gate 2 and is led by wire 3 to swing flip-flop 4, the output $s_1$, of which becomes marked "1".

Through wire 5, condition "1" marks the pulse input E of register 6 at an instant which will be taken as the origin of time in the following description. After a delay smaller than $\theta$ (for example $r\theta$, $r$ being comprised between 0 and 1), a timing pulse that arrives through wire 23 at section A1 causes the said marking to appear at output $S_1$. The next timing pulse, which arrives at instant $r\theta + \theta$, lets output $S_1$ stay marked "1" and causes the same marking to appear at output $S_2$. Owing to the next timing pulse, which arrives at instant $r\theta + 2\theta$, output $S_3$ in turn is marked "1", the same marking remaining at outlets $S_1$ and $S_2$. Wires 7a, 7b and 7c and gate 8 transmit this value "1" when it appears at all of the three outlets $S_1, S_2$ and $S_3$ and this value through wire 9 swings flip-flop 4, the output $S_1$ of which assumes condition "0". Input E of register 6 is then no longer marked.

When the next timing pulse comes in at a time $r\theta + 3\theta$, output $S_1$ is reset to value "0" while the three following outputs $S_2, S_3$ and $S_4$ are marked "1". These three joint markings progress then to the right as a whole and by steps at the rate $\theta$ of the timing pulses. When the pulse initially occuring at the output of gate 2 is not the first one of an interrogation pair of a conventional mode $n$ or $m$ but rather is a spurious pulse, it disappears at the end F of register 6.

On the contrary, when a second pulse occurs at the output of gate 2 after a time of about $T_n = n\theta$, (which corresponds to the interrogation mode $n$ that the decoder is adapted to recognize), it reaches, through wire 12 and branch $12_{n-1}$ thereof, the one of the inputs of gate $11_{n-1}$. Through wire $10_{n-1}$, the marking that comes out from output $S_{n-1}$ of section $A_{n-1}$ of register 6 according to a process considered below is applied to the other input of said gate $11_{n-1}$. This gate opens, and a signal donating recognition of the interrogation mode $n$ occurs at the output of gate $11_{n-1}$.

Input $g_n$ of block 18 is energized through wire $13_{n-1}$, and the response message starts being set up. At the same time and through wire $13'_{n-1}$, gate 14 and wire 15, the reset input $e_2$ of flip-flop 16 is marked. Output $S_1$ from this flip-flop swings to condition "0", which is also applied to the second input of gate 2. This gate closes and prevents any further pulse from entering the decoder. Reset input Z of frequency divider 22 is energized through wire 15a. When the setting up of the response message in block 18 is ended, a pulse comes out of output $W_2$ from said block and through wire 19, it swings flip-flop 16. Output $S_1$ from this flip-flop turns to condition "1", and the second input of gate 2 is marked through wire 17, which enables this gate so that any further pulse occurring at input 1 can then enter the decoder.

The principles of operations would of course be described the same if the interrogation received corresponded to mode m characterized by a nominal spacing (by $T_m = m\theta$) of the two pulses. In that case, section $A_{m-1}$ and output $S_{m-1}$ of register 6 as well as gate $11_{m-1}$ should be considered.

Let us now turn back to the detailed description of the process of an interrogation recognition, i.e. a coincidence of the first interrogation pulse, as delayed in register 6, appearing at output $S_{n-1}$ or input of gate $11_{n-1}$, with the second pulse coming out of gate 2 and occurring at the second input of said gate $11_{n-1}$.

Figure 7:
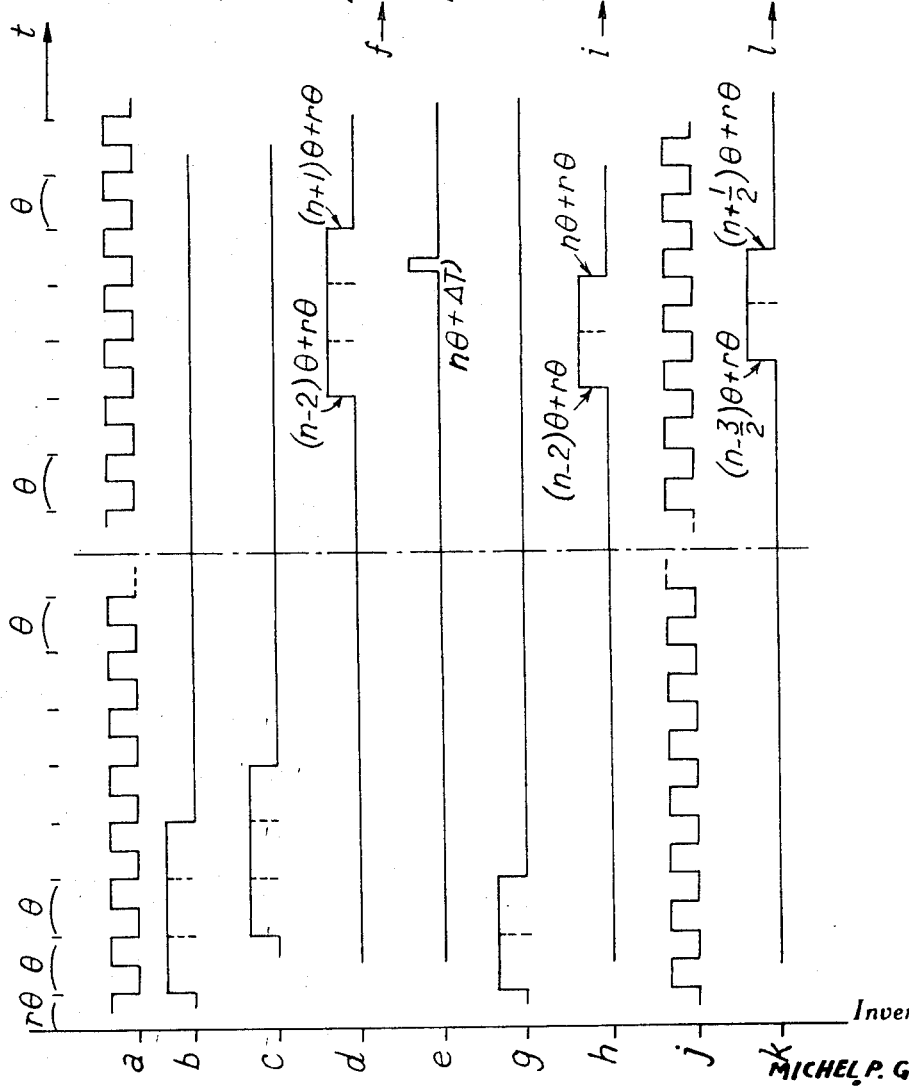
FIG. 7 shows explanatory waveform diagrams which allow the invention to be better understood.

To this end, the explanatory diagrams in FIG. 7, will be referred to in connection with FIG. 6.

Diagram (a) FIG. 7 shows a scale of times based on the pulses from the timing clock, the period or step of which is $\theta$.

The pulses that mark the pulse input E of register 6 (see FIG. 6) at an instant 0 are processed by the trailing edge of a pulse from the timing clock after a delay $r\theta$, where $r$ is a random parameter comprised between 0 and 1.

Diagram (b) of FIG. 7 shows the marking at output $S_1$ of section $A_1$ of register 6 (see FIG. 6) in accordance with the operation described hereabove.

Likewise, diagram (c) shows the marking at output $S_2$ from section $A_2$ of register 6.

Lastly, diagram (d) shows the marking at outlet $S_{n-1}$ from section $A_{n-1}$ of register 6 (FIG. 6), from which output the recognition of the interrogations will be carried out. This output $S_{n-1}$ (and therefore also the first input of gate $11_{n-1}$ of FIG. 6) begins to be marked at an instant $(n-2)\theta + r\theta$, and this marking lasts until $(n+1)\theta + r\theta$.

Diagram (e) of FIG. 7 shows the second pulse of a pair, which comes in by a time $n\theta$ at the second input of gate $11_{n-1}$ (FIG. 6). The nominal spacing between the leading edges of the two pulses of a mode $n$ interrogation is equal to $T_n = n\theta$, but there is some shift $\Delta T$ from this value of $T_n$. The exact instant when the second pulse comes in is thus $n\theta + \Delta T$, and a coincidence will be stated when $\Delta T$ is comprised within the limits $-2\theta + r\theta$ and $\theta + r\theta$.

Curve (f) at the right of FIG. 7 shows the variations of these limits as a function of $r$. When $\Delta T$ is comprised between $-\theta$ and $+\theta$, a coincidence will always occur, so that the rate of response $\rho$ is equal to 1 with shifts $|\Delta T|$ comprised between 0 and $\theta$. When $|\Delta T|$ exceeds $2\theta$, a coincidence is no longer possible. Then, with intermediate values, $r$ assumes the meaning of a probability and is the same as the mean rate of response. So it will be seen that with $|\Delta T| = 3\theta/2$, $\rho$ is equal to ½.

Thus, curve (f) of FIG. 7 is a curve which shows the rate of response in the decoder for interrogations of mode $n$, as a function of the shift $\Delta T$ from a nominal value $T_n$ (where $T_n = n\theta$) of the time interval between the two pulses that characterize these interrogations, in the case where the pulses are entered three times into register 6 according to the method described with reference to FIG. 6. It will be also noted that this curve $\rho = f(\Delta T)$ is symmetrical relatively to the nominal value $T_n$.

In case the pulses are entered five, or seven, or ... $(2p + 1)$ times into input E of register 6 (FIG. 6), operation is handled in the same way. Symmetrical curves of shifts would be obtained, which would show rates of response equal to 1 with shifts smaller than $p\theta$ and null with shift beyond $(p+1)\theta$.

As regards the advantages of the invention, it should be remarked that an interrogation will be recognized from a single output $S_{n-p}$ of register 6. The known methods that would combine signals from several adjacent outputs would require $n + p$ sections for obtaining a similar curve $\rho = f(\Delta T)$. A simple analysis would show that the rank of said single outlet will be $n - p$ in case the pulses are entered $2p + 1$ times into inlet E of register 6.

Turning back to the decoder shown in FIG. 6, it will be seen that the number of sections in register 6 can be limited to $m - p$ for recognizing an interrogation mode characterized by a nominal spacing $n\theta$ between the two pulses.

For a better understanding of the invention it is appropriate, to examine the operation when an incoming pulse is entered twice instead of three times into input E of register 6 in the interrogation decoder shown in FIG. 6. In that case, outlets $S_1$ and $_2$ instead of outlets $S_1$, $S_2$ and $S_3$ will be joined through AND gate 8 to reset input $e_2$ of flip-flop 4.

Diagram (g) in FIG. 7 shows the course of the marking at output $S_1$ of section $A_1$ in register 6 when an incoming pulse is entered twice. Then, diagram (h) shows the course of the marking at output $S_{n-1}$ of section $A_{n-1}$, where the recognition of the interrogations is carried out. Output $S_{n-1}$ becomes marked at a time $(n-2)\theta + r\theta$, and this marking lasts until a time $n\theta + r\theta$.

Returning to the notation already used and referring again to diagram (*e*) of FIG. 7, discussed already above, it will be stated that there will be a coincidence between the first pulse, as delayed in the register, and the second one of an interrogation pair of mode *n*, provided $\Delta T$ is comprised within the limits $-2\theta + r\theta$ and $r\theta$.

Curve (*i*) in the right-hand portion of FIG. 7 shows the variations of these limits as a function of *r*. When $\Delta T$ is comprised between $-\theta$ and 0, a coincidence will always occur, so that the rate of response $\rho$ when, the shift is comprised between $-\theta$ and 0 is, equal to 1. When the negative value of $\Delta T$ is greater than $2\theta$, or, else when $\Delta T$ is positive and larger than $\theta$, there is no coincidence possible. Then, for intermediate values, *r* has the meaning of a probability and thus amounts to the probable rate of response $\rho$. It will be seen that when $\Delta T$ is $-3\theta/2$, or $\theta/2$, $\rho$ is equal to ½.

It will be noted that curve (*i*) is not centered about the value $T_n = n\theta$ of the nominal interval between the two pluses of a mode *n* interrogation. This curve $\rho = f(\Delta T)$ is unsymmetrical.

So as to have it centered, an additional delay of one half step, $\theta/2$, is artificially obtained in the shift register.

In case the incoming pulses are entered four, six or $2p$ times, they would be processed in the same way. Symmetrical curves $\rho = f(\Delta T)$ are obtained by providing an additional delay of $\theta/2$, and these curves show rates of response equal to 1 with shifts $|\Delta T|$ smaller than $(p - ½) \theta$ and nil with shifts $|\Delta T|$ beyond $(p + ½) \theta$.

From the standpoint of the advantages of the present invention, it should be further noted at this point that, in case the pulses are entered $2p$ times into input E of register 6 (FIG. 6), the interrogation is recognized at outlet $S_{n-p}$ of a rank $n-p$.

Figure 8:
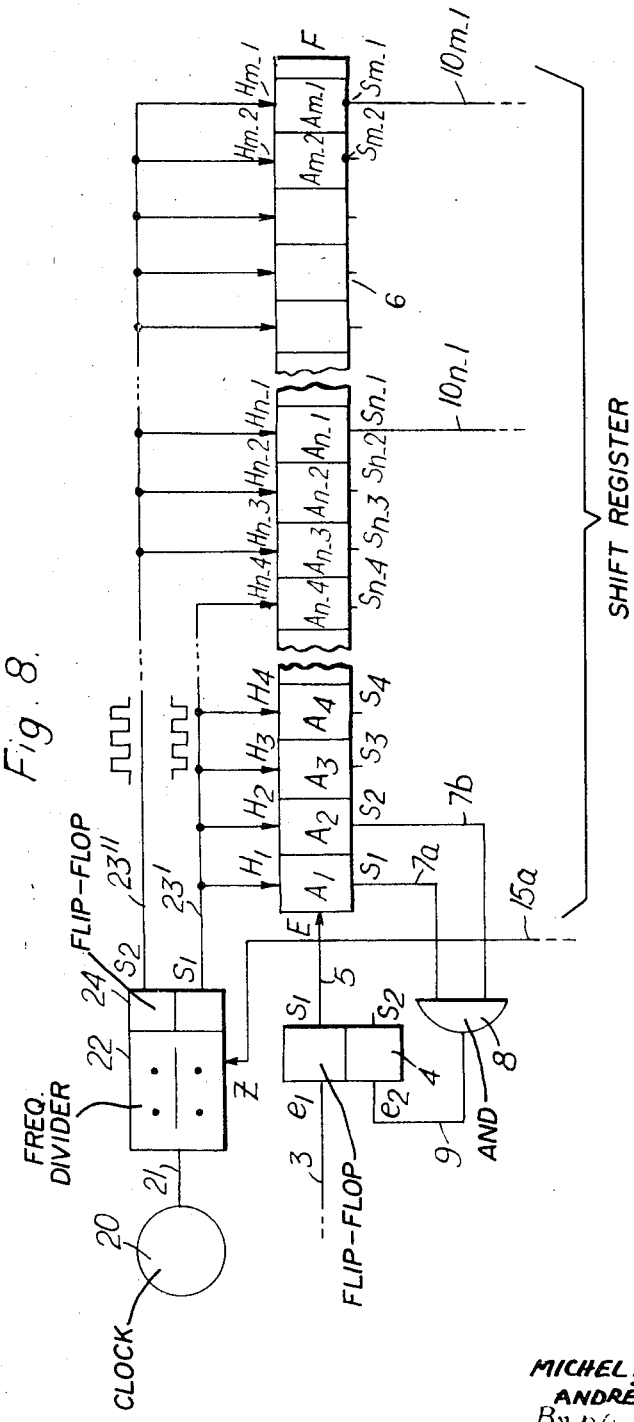
FIG. 8 is a circuit diagram of a portion of an interrogation-pair decoder including devices adapted to provide an additional lag (by half a step) in the shift register.

FIG. 8 shows a decoder according to the invention, much like that in FIG. 6, but which comprises some modifications, which allow an additional delay of one half step, $\theta/2$, to be obtained at the level of those outputs from the shift register at which the recognition of the interrogations is carried out when the incoming pulses are entered twice into the input of register 6. The diagram FIG. 8 comprises only such parts as necessary for the understanding of the invention. The omitted parts may be found in FIG. 6.

The frequency divider 22 which supplies register 6 with timing pulses having a step $\theta$ is formed, in accordance with a known pattern, of a cascade of flip-flops. Only the last flip-flop 24 is shown. A first train of timing pulses comes out of an output $S_1$ of flip-flop 24, and a second train of pulses comes out of an output $S_2$, which is complementary to output $S_1$. The pulses of this second train have a phase opposed to that of the said first train, which means that the trailing edges of the pulses of said second train lag by half a step $\theta/2$ relative to those of the first train.

The pulses of the first train are led by a wire 23' to the timing inputs $H_1, H_2 \ldots H_{n-4}$ of the $n-4$ sections of register 6. The pulses of the second train are led by a wire 23" to the timing inputs $H_{n-3}, H_{n-2}, H_{n-1}$ and so on up to the end F of register 6.

A marking, which is applied to input E of register 6 according to a process described hereinbefore, progresses through register 6 at the rate $\theta$ of the first train of timing pulses up to section $A_{n-4}$ of a rank $n - 4$.

That marking reaches the next section $A_{n-3}$ after a time $3\theta/2$ instead of a time $\theta$, since the timing pulses that operate from the section of rank $n-3$ are those of the second train, which are retarded by $\theta/2$ relative to those of the first train operating in the first $n - 4$ register sections.

The operation of the decoder shown in FIG. 8 will not be described, as it is not different, except for the modification stated above, from that of FIG. 6.

In FIG. 7, diagram (*j*) shows the timing pulses of the second train, which are retarded by half a step, $\theta/2$, relative to those of diagram (*a*). Diagram (*g*) already mentioned, shows the course of the marking in the time, at output $S_1$ from section $A_1$ of register 6 (FIG. 8). Similarly, diagram (*k*) shows the course of the marking at output $S_{n-1}$ from section $A_{n-1}$ of register 6. Output $S_{n-1}$ begins to be marked at a time $(n - 3/2) \theta + r\theta$, and this marking lasts until a time $(n + ½) \theta + r\theta$.

Resuming the reasoning already used several times hereinabove, it can be stated that a symmetrical curve (*l*), shown in the right-hand portion of FIG. 7, will be obtained for a curve $\rho = f(\Delta T)$.

According to a modification of this invention, the additional delay of half a step may be obtained by adding a small quantity $\Delta \theta$ to $\theta = T_n/n$, so that the additional delay increases to $\theta/2$ when the marking from the incoming pulse reaches section $A_{n-1}$ of rank $n-1$ in register 6 (FIG. 6). This implies that $\Delta T = \theta/2n-1$, which then means that the new value of the slightly increased step is $(\theta + \Delta\theta) = T_n/n-½$.

Turning back to the decoder shown in FIG. 6, which is designed for two interrogation modes, it will be easily understood that it is not possible to attain the additional delay of $\theta/2$ for both modes by the method just described, when the pulses are entered into register 6 an even number of times.

However, in some instances when $T_m$ is an odd multiple of $T_n$, i.e. $T_m = (2k+1) T_n$, an additional delay of $(k + ½) \theta$ will be obtained at output $S_{m-1}$ from section $A_{m-1}$ of rank $m - 1$ when the step $\theta$ is adjusted so that an additional delay of $\theta/2$ is obtained at the level of output $S_{n-1}$ from section $A_{n-1}$. This will then suffice to recognize an interrogation of mode $m$ at the output from a section of register 6, having a rank $m - (1 + k)$, for attaining the desired additional delay of $\theta/2$ also in such instance.

I claim:

1. A system for recognition of an incoming pulse code group including at least a pair of pulses nominally spaced by $T_o$, but subject to extraneous variations thereabout, said system including means for generating periodic clock pulses, an input for receiving said incoming pulse group, a shift register responsive at a signal input to said incoming pulse code group and at a control input to said clock pulses for advancing the pulses received at said signal input one register section for each clock pulse, comprising:

a set of coincidence detectors each having an input connected to receive said incoming pulse code group;

means for applying the first pulse of each incoming pair q successive times to the input of said register;

and means for recognizing said pair at an output S comprising a predetermined tap along said register, wherein S is equal to $n - (a/2)$ when q is an even number, and S is equal to $n - (q-1)/2$ when $q$ is an odd number, S being equal to the interval $T_o$ divided by the period $\theta$ of said clock pulses.

2. A system for recognition of pairs of incoming pulses spaced apart by an interval of time T, said interval being variable about a nominal value $T_o$, said system comprising:

means for producing periodic timing pulses;
an input for receiving said incoming pulses;
a shift register synchronized by said timing pulses and responsive to record said incoming pulse;
a set of coincidence detectors, each of said detectors being connected to said input;
means for applying the first incoming pulse of each pair $q$ successive times to the input of said register;
and means for recognizing said pair at an output tap S along said register, S being equal to $n - (q/2)$ when $q$ is an even number and S being equal to $n - (q-1)/2$ when $q$ is an odd number, n being equal to $T_o/\theta + \frac{1}{2}$.

* * * * *